(12) United States Patent
Yoshida et al.

(10) Patent No.: US 10,518,210 B2
(45) Date of Patent: Dec. 31, 2019

(54) GAS CLEAN-UP UNIT AND GAS PURIFICATION METHOD

(71) Applicant: Mitsubishi Heavy Industries Engineering, Ltd., Kanagawa (JP)

(72) Inventors: Kaori Yoshida, Tokyo (JP); Haruaki Hirayama, Tokyo (JP); Rikio Kan, Hiroshima (JP); Seiji Kakesako, Hiroshima (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 16/321,946

(22) PCT Filed: Nov. 17, 2017

(86) PCT No.: PCT/JP2017/041514
§ 371 (c)(1),
(2) Date: Jan. 30, 2019

(87) PCT Pub. No.: WO2018/097063
PCT Pub. Date: May 31, 2018

(65) Prior Publication Data
US 2019/0176079 A1   Jun. 13, 2019

(30) Foreign Application Priority Data
Nov. 22, 2016 (JP) .................. 2016-226753

(51) Int. Cl.
*B01D 53/14* (2006.01)
*B01D 53/86* (2006.01)
(Continued)

(52) U.S. Cl.
CPC ......... *B01D 53/1406* (2013.01); *B01D 53/14* (2013.01); *B01D 53/1468* (2013.01);
(Continued)

(58) Field of Classification Search
CPC ........ C10K 1/004; C10K 1/34; C10K 1/0006; C10K 1/08; C10K 1/002; C10K 1/205;
(Continued)

(56) References Cited

U.S. PATENT DOCUMENTS

| 3,556,721 A * | 1/1971 | Radusch ............... B01D 53/14 423/234 |
| 6,274,109 B1 | 8/2001 | Matsumoto et al. |
| 2012/0010306 A1 * | 1/2012 | Chiche .................. B01D 53/52 518/705 |

FOREIGN PATENT DOCUMENTS

| EP | 380184 A1 | 8/1990 |
| EP | 661372 A1 | 7/1995 |

(Continued)

OTHER PUBLICATIONS

International Search Report issued in corresponding International Patent Application No. PCT/JP2017/041514, dated Jan. 16, 2018 (3 pages).

(Continued)

*Primary Examiner* — Timothy C Vanoy
(74) *Attorney, Agent, or Firm* — Osha Liang LLP (57) ABSTRACT

A gas clean-up unit includes a first conversion unit configured to perform a first conversion process of converting hydrogen cyanide contained in gas to be treated to ammonia, in presence of a first catalyst and at a first predetermined temperature; a second conversion unit configured to perform a second conversion process of converting carbonyl sulfide in the gas that has been subjected to the first conversion process to hydrogen sulfide, in presence of a second catalyst and at a second predetermined temperature lower than the first predetermined temperature; a cleaning unit configured to perform a cleaning process of bringing the gas into gas-liquid contact with cleaning liquid to remove the ammonia by cleaning; and a desulfurization unit configured to
(Continued)

absorb and remove hydrogen sulfide in the gas by bringing the gas that has been subjected to the cleaning process into gas-liquid contact with absorbent.

7 Claims, 6 Drawing Sheets

(51) Int. Cl.
*C10K 1/34* (2006.01)
*C10K 1/08* (2006.01)
*C10K 1/00* (2006.01)

(52) U.S. Cl.
CPC ....... *B01D 53/8603* (2013.01); *B01D 53/869* (2013.01); *C10K 1/004* (2013.01); *C10K 1/006* (2013.01); *C10K 1/08* (2013.01); *C10K 1/34* (2013.01); *B01D 2252/103* (2013.01); *B01D 2255/1026* (2013.01); *B01D 2255/2042* (2013.01); *B01D 2255/20746* (2013.01); *B01D 2255/20753* (2013.01); *B01D 2255/20769* (2013.01)

(58) Field of Classification Search
CPC ............................ B01D 53/14; B01D 53/1406; B01D 53/1408; B01D 53/8603; B01D 53/869; B01D 2252/103

See application file for complete search history.

(56) References Cited

FOREIGN PATENT DOCUMENTS

| | | |
|---|---|---|
| EP | 661373 A1 | 7/1995 |
| JP | S54-18466 A | 2/1979 |
| JP | H02-245094 A | 9/1990 |
| JP | H07-257903 A | 10/1995 |
| JP | H11-080760 A | 3/1999 |
| JP | 2000-86211 A | 3/2000 |
| JP | 2000-248286 A | 9/2000 |
| JP | 4227676 B2 | 2/2009 |

OTHER PUBLICATIONS

Written Opinion of the International Searching Authority issued in corresponding International Patent Application No. PCT/JP2017/041514, dated Jan. 16, 2018 (11 pages).

\* cited by examiner

GAS CLEAN-UP UNIT AND GAS PURIFICATION METHOD

FIELD

The present invention relates to a gas clean-up unit and a gas purification method, and for example, relates to a gas clean-up unit and a gas purification method that purify gas to be treated such as coal gasification gas.

BACKGROUND

Conventionally, a gas clean-up unit including a COS converter that converts carbonyl sulfide in gas to be treated such as coal gasification gas to hydrogen sulfide, in the presence of a catalyst, has been developed (for example, see Patent Literature 1). In the COS converter of the gas clean-up unit, carbonyl sulfide contained in the coal gasification gas is hydrolyzed to hydrogen sulfide and carbon dioxide by the hydrolysis reaction represented by the following reaction formula (1).

$$COS + H_2O \Leftrightarrow H_2S + CO_2 \qquad \text{formula(1)}$$

CITATION LIST

Patent Literature

Patent Literature 1: Japanese Patent No. 4227676

SUMMARY

Technical Problem

The hydrolysis reaction represented by the reaction formula (1) described above is a reversible reaction with heat generation. Consequently, a low temperature condition is advantageous for reducing carbonyl sulfide from the equilibrium constraint relation. However, when the reaction temperature for hydrolyzing carbonyl sulfide is too low, trace components contained in the coal gasification gas such as ammonia, halogen, and hydrocarbon may be deposited. Consequently, in the COS converter, carbonyl sulfide is hydrolyzed at a temperature condition higher than that at which the trace components are deposited. However, when the concentration of carbonyl sulfide in the gas to be treated is high (for example, equal to or more than 1000 ppm), it is sometimes difficult to reduce the concentration of carbonyl sulfide to a desired concentration.

An object of the present invention is to provide a gas clean-up unit and a gas purification method that can effectively reduce the concentration of carbonyl sulfide in gas to be treated, even when the concentration of carbonyl sulfide in the gas to be treated is high.

Solution to Problem

A gas clean-up unit of the present invention includes a first conversion unit configured to perform a first conversion process of converting hydrogen cyanide contained in gas to be treated to ammonia, in presence of a first catalyst and at a first predetermined temperature; a second conversion unit configured to perform a second conversion process of converting carbonyl sulfide in the gas to be treated that has been subjected to the first conversion process to hydrogen sulfide, in presence of a second catalyst and at a second predetermined temperature that is lower than the first predetermined temperature; a cleaning unit configured to perform a cleaning process of bringing the gas to be treated into gas-liquid contact with cleaning liquid to remove the ammonia by cleaning; and a desulfurization unit configured to absorb and remove hydrogen sulfide in the gas to be treated by bringing the gas to be treated that has been subjected to the cleaning process into gas-liquid contact with absorbent.

With this configuration, halogen, ammonia obtained through the first conversion process performed by the first conversion unit, and the like are removed by cleaning in the first cleaning process. Consequently, even when the gas to be treated is cooled to the first predetermined temperature or less, it is possible to prevent the deposition of trace components in the gas to be treated. Thus, not only the process on hydrogen cyanide contained in the gas to be treated will not be necessary, but it is also possible to hydrolyze carbonyl sulfide to hydrogen sulfide while cooling the gas to be treated after the first conversion process, to the second predetermined temperature that is suitable for converting carbonyl sulfide. Moreover, because carbonyl sulfide in the gas to be treated is converted to hydrogen sulfide in two steps of the first conversion process and the second conversion process, it is possible to effectively reduce the concentration of carbonyl sulfide in the gas to be treated to a desired concentration. Consequently, it is possible to implement the gas clean-up unit that can effectively reduce the concentration of carbonyl sulfide in the gas to be treated, even when the concentration of carbonyl sulfide in the gas to be treated is high.

In the gas clean-up unit of the present invention, it is preferable that the cleaning unit includes a first cleaning unit configured to perform a first cleaning process of bringing the gas to be treated that has been subjected to the first conversion process into gas-liquid contact with cleaning liquid, and a second cleaning unit configured to perform a second cleaning process of bringing the gas to be treated that has been subjected to the second conversion process into gas-liquid contact with cleaning liquid. With this configuration, the gas clean-up unit can remove ammonia and halogen in the gas to be treated after the first conversion process, through the first cleaning process performed by the first cleaning unit. Consequently, it is possible to effectively prevent the deposition of trace components in the gas to be treated, and remove impurities contained in the gas to be treated after the second conversion process through the second cleaning process performed by the second cleaning unit.

The gas clean-up unit of the present invention preferably further includes a gasification unit configured to produce the gas to be treated containing carbonyl sulfide by gasifying a feedstock, and to supply the produced gas to be treated to the first conversion unit. With this configuration, the gas clean-up unit can effectively reduce carbonyl sulfide in the gas to be treated, even when the concentration of carbonyl sulfide in the gas to be treated obtained by gasifying a feedstock such as heavy oil and coal is high.

In the gas clean-up unit of the present invention, the first conversion unit preferably converts carbonyl sulfide to hydrogen sulfide and converts hydrogen cyanide to ammonia. With this configuration, in the first conversion process, the first catalyst for decomposing hydrogen cyanide that selectively decomposes hydrogen cyanide can be used for carbonyl sulfide. Consequently, it is also possible to use the first catalyst different from the second catalyst that hydrolyzes carbonyl sulfide.

In the gas clean-up unit of the present invention, the first predetermined temperature is preferably equal to or higher than 240 degrees Celsius and equal to or lower than 350 degrees Celsius. With this configuration, it is possible to further effectively prevent the deposition of trace components such as ammonia, halogen, and hydrocarbon contained in the coal gasification gas after the first conversion process.

In the gas clean-up unit of the present invention, the second predetermined temperature is preferably equal to or higher than 150 degrees Celsius and equal to or lower than 240 degrees Celsius. With this configuration, it is possible to effectively convert carbonyl sulfide to hydrogen sulfide through the second conversion process.

A gas purification method of the present invention includes the steps of: performing a first conversion process of converting hydrogen cyanide contained in gas to be treated to ammonia, in presence of a first catalyst and at a first predetermined temperature; performing a second conversion process of converting carbonyl sulfide in the gas to be treated that has been subjected to the first conversion process to hydrogen sulfide, in presence of a second catalyst and at a second predetermined temperature that is lower than the first predetermined temperature; bringing the gas to be treated into gas-liquid contact with cleaning liquid to remove the ammonia by cleaning; and bringing the gas to be treated from which ammonia is removed by cleaning into gas-liquid contact with absorbent to remove hydrogen sulfide in the gas to be treated by absorbing.

With this method, halogen, ammonia obtained through the first conversion process performed by the first conversion unit, and the like are removed by cleaning in the first cleaning process. Consequently, even when the gas to be treated is cooled to the first predetermined temperature or less, it is possible to prevent the deposition of trace components in the gas to be treated. Thus, not only the process on hydrogen cyanide will not be necessary, but it is also possible to perform the second conversion process of converting carbonyl sulfide to hydrogen sulfide, while cooling the gas to be treated to which the first conversion process is performed, to the second predetermined temperature that is suitable for converting carbonyl sulfide. Moreover, because carbonyl sulfide in the gas to be treated is converted to hydrogen sulfide in two steps of the first conversion process and the second conversion process, it is possible to effectively reduce the concentration of carbonyl sulfide in the gas to be treated to a desired concentration. Consequently, it is possible to implement the gas purification method that can effectively reduce the concentration of carbonyl sulfide in the gas to be treated, even when the concentration of carbonyl sulfide in the gas to be treated is high.

In the gas purification method of the present invention, the step of cleaning preferably includes the steps of performing a first cleaning process of bringing the gas to be treated that has been subjected to the first conversion process into gas-liquid contact with cleaning liquid, and performing a second cleaning process of bringing the gas to be treated that has been subjected to the second conversion process into gas-liquid contact with cleaning liquid. With this method, the gas clean-up unit can remove ammonia and halogen in the gas to be treated after the first conversion process through the first cleaning process. Consequently, it is possible to effectively prevent the deposition of trace components in the gas to be treated, and remove impurities contained in the gas to be treated after the second conversion process through the second cleaning process.

The gas purification method of the present invention preferably further includes a step of producing the gas to be treated containing carbonyl sulfide by gasifying a feedstock. With this method, the gas clean-up unit can effectively reduce carbonyl sulfide in the gas to be treated, even when the concentration of carbonyl sulfide in the gas to be treated obtained by gasifying a feedstock such as heavy oil and coal is high.

Advantageous Effects of Invention

According to the present invention, it is possible to implement the gas clean-up unit and the gas purification method that can effectively reduce carbonyl sulfide in the gas to be treated, even when the concentration of carbonyl sulfide in the gas to be treated is high.

DESCRIPTION OF EMBODIMENTS

The present inventors have focused on the fact that the carbonyl sulfide converter used in a conventional gas clean-up unit cannot effectively reduce the concentration of carbonyl sulfide in the gas to be treated containing high-concentration of carbonyl sulfide such as coal gasification gas. The present inventors have found out that even when the gas to be treated containing high-concentration of carbonyl sulfide is used, it is possible to reduce the concentration of carbonyl sulfide to a desired concentration, while preventing the deposition of trace components in the gas to be treated, by decomposing hydrogen cyanide contained in the gas to be treated, and by converting carbonyl sulfide to hydrogen sulfide at a temperature suitable for converting carbonyl sulfide. Thus, the present invention has been completed.

Hereinafter, embodiments of the present invention will be described in detail with reference to the accompanying drawings. It is to be understood that the present invention is not limited to the following embodiments, and may be suitably modified.

First Embodiment

Figure 1:
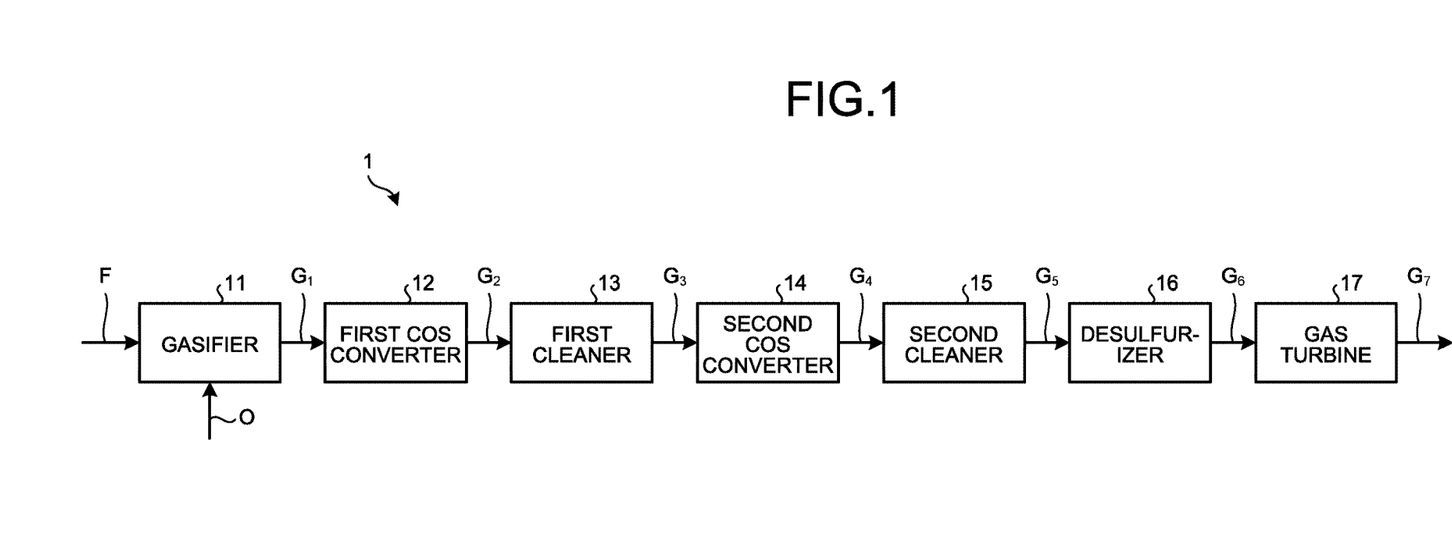
FIG. 1 is a schematic diagram illustrating an example of a gas clean-up unit according to a first embodiment of the present invention.

FIG. 1 is a schematic diagram illustrating an example of a gas clean-up unit 1 according to a first embodiment of the present invention.

As illustrated in FIG. 1, the gas clean-up unit 1 according to the present embodiment includes a gasifier (gasification unit) 11 to which a feedstock F and an oxygen containing gas O are fed, a first carbonyl sulfide converter (first conversion unit) 12 (hereinafter, referred as a "first COS converter 12") provided in the subsequent stage of the gasifier 11, a first cleaner (first cleaning unit) 13 provided in the subsequent stage of the first COS converter 12, a second carbonyl sulfide converter (second conversion unit) 14 (hereinafter, referred to as a "second COS converter 14") provided in the subsequent stage of the first cleaner 13, a second cleaner (second cleaning unit) 15 provided in the subsequent stage of the second COS converter 14, and a desulfurizer (desulfurization unit) 16 provided in the subsequent stage of the second cleaner 15. A gas turbine 17 is provided in the subsequent stage of the desulfurizer 16.

The gasifier 11 produces gasification gas (gas to be treated) $G_1$ containing carbonyl sulfide and hydrogen cyanide by gasifying the supplied feedstock F and oxygen containing gas O. Moreover, the gasifier 11 supplies the produced high-temperature gasification gas $G_1$ to the first COS converter 12. The feedstock F is not particularly limited as long as the feedstock F produces carbonyl sulfide as a byproduct, and for example, coal, heavy oil, or the like that has a high sulfur concentration is used. The gas clean-up unit 1 can effectively reduce the concentration of carbonyl sulfide even when coal containing a high proportion of sulfur component that produces a large amount of carbonyl sulfide is used, among the coal, heavy oil, or the like. The oxygen containing gas O is not particularly limited as long as the oxygen containing gas O is capable of oxidizing the feedstock, and for example, oxygen and the like may be used. The gasifier 11 is not necessarily required as long as the gasification gas $G_1$ can be supplied to the first COS converter 12.

In the presence of a first catalyst and at a first predetermined temperature, the first COS converter 12 performs a first conversion process of converting hydrogen cyanide contained in the gasification gas $G_1$ to ammonia as represented by the following reaction formula (1), and converting carbonyl sulfide to hydrogen sulfide as represented by the following reaction formula (2) and the following reaction formula (3). Moreover, the first COS converter 12 supplies gasification gas $G_2$ that contains ammonia and hydrogen sulfide produced by the first conversion process to the first cleaner 13. By performing the first conversion process as described above, it is possible to decompose carbonyl sulfide and hydrogen cyanide contained in the gasification gas $G_1$. Consequently, it is possible to reduce the concentration of carbonyl sulfide in the gasification gas $G_1$, and remove hydrogen cyanide therefrom.

$$COS+H_2O \Leftrightarrow H_2S+CO_2 \qquad \text{formula(1)}$$

$$HCN+H_2O \Leftrightarrow NH_3+CO \qquad \text{formula (2)}$$

$$HCN+3H_2 \Leftrightarrow NH_3+CH_4 \qquad \text{formula (3)}$$

The first catalyst is not particularly limited as long as the first catalyst can decompose hydrogen cyanide and carbonyl sulfide. The first catalyst may be a hydrolysis catalyst containing an active component that decomposes carbonyl sulfide and hydrogen cyanide, and a titanium oxide-based carrier that carries the active component, or the like.

For example, a component mainly composed of at least one type of metal selected from a group consisting of barium, nickel, ruthenium, cobalt, and molybdenum may be used as the active component. One type of metal may be used independently, or two or more types of metal may be used together. By using the metal as described above as the main component, it is possible to effectively decompose not only carbonyl sulfide but also hydrogen cyanide. For example, the amount of the active component to be carried is preferably between equal to or more than 0.1 mass % and equal to or less than 25 mass %, and more preferably between equal to or more than 1 mass % and equal to or less than 22 mass %.

For example, titanium oxide and composite oxide containing titanium oxide and the other oxide may be used as the titanium oxide-based carrier. By using the titanium oxide-based carrier such as the above, it is possible to fix the active component without fail. Moreover, because the titanium oxide-based carrier is chemically stable under the use conditions of the first catalyst, the function of the catalyst will not be blocked. It is preferable to use titanium oxide having an anatase type crystal structure that has a large specific surface area, as the titanium oxide. Consequently, the amount of the active component to be carried is increased, thereby improving the catalyst activity. For example, the composite oxide includes a titanium oxide-based composite oxide such as a composite oxide containing titanium oxide and silicon oxide, a composite oxide containing titanium oxide and aluminum oxide, a composite oxide containing titanium oxide and zirconium oxide, and the like. The composite ratio of titanium oxide and metal oxide to be combined is preferably within a range of 1:99 to 99:1, and more preferably within a range of 50:50 to 95:5. Consequently, because it is possible to increase the specific surface area that is an area for carrying the active component, it is possible to improve the catalyst performance of the first catalyst. By using the titanium oxide-based composite oxide as described above, the specific surface area of the first catalyst is increased, thereby improving the heat resistance. One type of the titanium oxide-based carrier may be used independently, or two or more types of titanium oxide-based carriers may be used together.

It is preferable to add at least one type of metal salt selected from a group consisting of barium carbonate, nickel carbonate, ruthenium nitrate, cobalt carbonate, and ammonium molybdate to the titanium oxide-based carrier as an additive. Because these additives are stable under the use conditions of the first catalyst, it is possible to use the first catalyst in a stable manner.

It is preferable that the first catalyst has a honeycomb shape. Thus, even in a use environment in which dust and the like coexist, it is possible to prevent clogging and pressure loss of the first catalyst. Consequently, it is possible to keep the first catalyst in a highly active state.

The temperature range of the first predetermined temperature is preferably equal to or higher than 240 degrees Celsius and equal to or lower than 350 degrees Celsius, more preferably equal to or higher than 240 degrees Celsius and equal to or lower than 320 degrees Celsius, and furthermore preferably equal to or higher than 240 degrees Celsius and equal to or lower than 300 degrees Celsius. By setting the temperature range of the first predetermined temperature as described above, it is possible to sufficiently reduce hydrogen cyanide in the gasification gas $G_1$ after the first conversion process, and effectively decompose carbonyl sulfide to hydrogen sulfide.

The first cleaner 13 performs a first cleaning process of removing ammonium in the gasification gas $G_2$ by bringing the gasification gas $G_2$ to which the first conversion process is performed into gas-liquid contact with cleaning liquid, and cooling the gasification gas $G_2$ to a second predetermined temperature that is lower than the first predetermined temperature. The first cleaner 13 also supplies gasification gas $G_3$ after the first cleaning process to the second COS converter 14. The cleaning liquid is not particularly limited as long as the cleaning liquid can remove ammonium in the gasification gas $G_2$ by cleaning, and for example, various types of cleaning water and the like may be used. In the first cleaning process, not only ammonium in the gasification gas $G_2$ is removed by cleaning, but also the gasification gas $G_2$ is cooled (for example, equal to or higher than 120 degrees Celsius and equal to or lower than 140 degrees Celsius) by coming into contact with cleaning liquid. By performing the first cleaning process as described above, it is possible to remove ammonium from the gasification gas $G_2$ that will be a cause for the deposition of trace components in the gasification gas $G_2$. It is also possible to cool the gasification gas $G_2$ to temperature suitable for hydrolyzing carbonyl sulfide performed in the second COS converter 14 in the subsequent stage. To effectively bring the temperature of the gasification gas $G_2$ after the first cleaning process to the second predetermined temperature, a heat exchanger that adjusts the temperature of the gasification gas $G_2$ to the second predetermined temperature may be provided between the first cleaner 13 and the second COS converter 14.

In the presence of the second catalyst and at the second predetermined temperature that is lower than the first predetermined temperature, the second COS converter 14 performs a second conversion process of converting carbonyl sulfide that still remains in the gasification gas $G_3$ to which the first cleaning process is performed to hydrogen sulfide, as represented by the following reaction formula (1). Moreover, the second COS converter 14 supplies gasification gas $G_4$ after the second conversion process to the second cleaner 15. In the second conversion process, because the gasification gas $G_3$ is cooled to a temperature suitable for hydrolyzing carbonyl sulfide by the first cleaning process, the chemical equilibrium of the following reaction formula (1), which is an exothermic reaction, becomes advantageous for the hydrolysis reaction of carbonyl sulfide. Consequently, it is possible to effectively reduce the concentration of carbonyl sulfide in the gasification gas $G_3$.

$$COS + H_2O \Leftrightarrow H_2S + CO_2 \quad \text{formula(1)}$$

The second catalyst is not particularly limited as long as the second catalyst can hydrolyze carbonyl sulfide. For example, a hydrolysis catalyst containing an active component that decomposes carbonyl sulfide and hydrogen cyanide, and a titanium oxide-based carrier that carries the active component, and the like may be used as the second catalyst. Moreover, the same catalyst as the first catalyst may be used as the second catalyst. Furthermore, a catalyst suitable for hydrolyzing carbonyl sulfide that is different from the first catalyst may also be used as the second catalyst. Still furthermore, a pellet-shaped catalyst may be used as the second catalyst.

The temperature range of the second predetermined temperature is preferably equal to or higher than 150 degrees Celsius and equal to or lower than 240 degrees Celsius, and more preferably equal to or higher than 180 degrees Celsius and equal to or lower than 200 degrees Celsius. By setting the temperature range of the second predetermined temperature as described above, the hydrolysis reaction of carbonyl sulfide proceeds quickly. Moreover, because the chemical equilibrium of the reaction formula (1) described above becomes advantageous for the hydrolysis reaction of carbonyl sulfide, it is possible to sufficiently reduce the concentration of carbonyl sulfide in the gasification gas $G_3$ after the second conversion process.

The second cleaner 15 performs a second cleaning process for removing ammonium and trace components in the gasification gas $G_4$ by bringing the gasification gas $G_4$ to which the second conversion process is performed into gas-liquid contact with cleaning liquid. By performing the second cleaning process, impurities in the gasification gas $G_4$ are removed by cleaning. Moreover, the second cleaner 15 supplies gasification gas $G_5$ after the second cleaning process to the desulfurizer 16. The cleaning liquid is not particularly limited as long as the cleaning liquid can remove hydrogen sulfide in the gasification gas $G_4$ by cleaning, and for example, various types of cleaning water and the like may be used.

The desulfurizer 16 absorbs and removes hydrogen sulfide contained in the gasification gas $G_5$, by bringing the gasification gas $G_5$ to which the second cleaning process is performed into gas-liquid contact with cleaning liquid. Consequently, it is possible to obtain clean syngas $G_6$ from which hydrogen sulfide contained in the gasification gas $G_5$ is removed. The absorbent is not particularly limited as long as the absorbent can absorb hydrogen sulfide, and an amine-based absorbent used for various desulfurization devices and the like is used. The desulfurizer 16 supplies the clean syngas $G_6$ from which hydrogen sulfide is removed to the gas turbine 17.

The gas turbine 17 generates power by burning the clean syngas $G_6$ supplied from the desulfurizer 16 with oxygen. Moreover, the gas turbine 17 discharges combustion flue gas $G_7$ generated by burning the clean syngas $G_6$ to the outside. It is to be noted that the clean syngas $G_6$ is also applicable for synthesizing various chemicals other than being a fuel for the gas turbine 17.

Next, the overall operation of the gas clean-up unit 1 will be described. The gasification gas $G_1$ that is produced by gasifying the feedstock F in the gasifier 11 is supplied to the first COS converter 12. In the first COS converter 12, the first conversion process is performed on the gasification gas $G_1$ at the first predetermined temperature (for example, equal to or higher than 240 degrees Celsius and equal to or lower than 350 degrees Celsius), and carbonyl sulfide is hydrolyzed to hydrogen sulfide. Moreover, hydrogen cyanide is decomposed into ammonia and removed from the gasification gas $G_1$, and the gasification gas $G_1$ is supplied to the first cleaner 13 as the gasification gas $G_2$. In the first cleaner 13, ammonia, halogen, and the like in the gasification gas $G_2$ are removed by cleaning through the first cleaning process of bringing the gasification gas $G_2$ into gas-liquid contact with cleaning liquid. Moreover, the gasification gas $G_2$ is cooled to the second predetermined temperature (for example, equal to or higher than 150 degrees Celsius and equal to or lower than 240 degrees Celsius), and is supplied to the second COS converter 14 as the gasification gas $G_3$. In this process, a heat exchanger may be used to heat the gasification gas $G_2$ after cleaning to equal to or higher than 150 degrees Celsius and equal to or lower than 240 degrees Celsius as required. In the second COS converter 14, carbonyl sulfide in the gasification gas $G_3$ is hydrolyzed by the second conversion process. The gasification gas $G_3$ is then supplied to the second cleaner 15 as the gasification gas $G_4$ the concentration of carbonyl sulfide of which is reduced to the predetermined concentration. In the second cleaner 15, impurities in the gasification gas $G_4$ are removed by the second cleaning process of bringing the gasification gas $G_4$ into gas-liquid contact with cleaning liquid, and the gasification gas $G_4$ is supplied to the desulfurizer 16 as the gasification gas $G_5$. In the desulfurizer 16, the gasification gas $G_5$ is supplied to the gas turbine 17 as the clean syngas $G_6$ from which hydrogen sulfide is removed, by bringing the gasification gas $G_5$ into gas-liquid contact with absorbent. In this process, the clean syngas $G_6$ from which hydrogen sulfide is removed by the desulfurizer 16 is supplied to the gas turbine 17. Consequently, it is possible to prevent the gas turbine 17 from being corroded by hydrogen sulfide. In the gas turbine 17, the clean syngas $G_6$ is burnt with oxygen, and is discharged as the combustion flue gas $G_7$.

Figure 2:
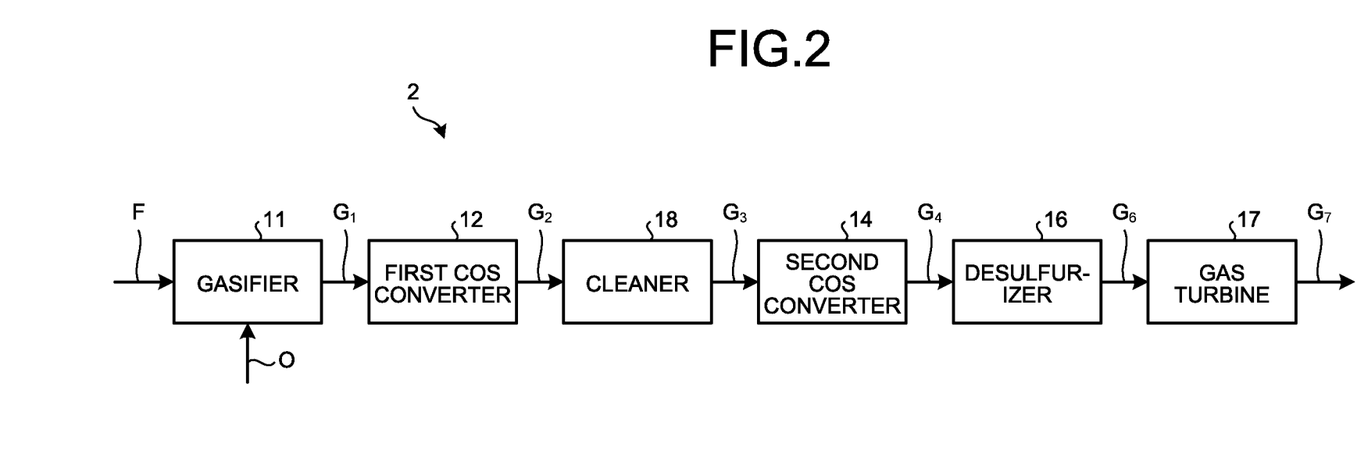
FIG. 2 is a schematic diagram illustrating another example of the gas clean-up unit according to the first embodiment of the present invention.

In the gas clean-up unit 1 illustrated in FIG. 1, an example of providing two cleaners of the first cleaner 13 and the second cleaner 15 is described. However, the gas clean-up unit 1 may also include a single cleaner. FIG. 2 is a schematic diagram illustrating another example of the gas clean-up unit according to the present embodiment. As illustrated in FIG. 2, in a gas clean-up unit 2, a cleaner 18 is provided in the subsequent stage of the first COS converter 12, and the desulfurizer 16 is provided in the subsequent stage of the second COS converter 14. In other words, in the gas clean-up unit 2, the cleaner 18 is provided instead of the first cleaner 13 in the gas clean-up unit 1 illustrated in FIG. 1, and the second cleaner 15 is omitted therefrom. Moreover, a heat exchanger that adjusts the gasification gas $G_2$ to the second predetermined temperature may be provided between the first COS converter 12 and the cleaner 18. Because the other configurations of the gas clean-up unit 2 are the same as those of the gas clean-up unit 1 illustrated in FIG. 1, the descriptions thereof will be omitted.

In the gas clean-up unit 2, the first COS converter 12 supplies the gasification gas $G_2$ that is obtained by performing a first conversion process on the gasification gas $G_1$, to the cleaner 18. Similar to the first cleaner 13 described above, the cleaner 18 performs a cleaning process of bringing the gasification gas $G_2$ into gas-liquid contact with cleaning liquid, and cools the gasification gas $G_2$ to a second processing temperature. Consequently, halogen, ammonia that is the decomposition of hydrogen cyanide in the gasification gas $G_2$, and the like are removed by cleaning. Moreover, the cleaner 18 supplies the gasification gas $G_3$ after the cleaning process to the second COS converter 14. The second COS converter 14 performs a second conversion process on the gasification gas $G_3$ and reduces the concentration of carbonyl sulfide in the gasification gas $G_3$ to a predetermined concentration or less. Then, the second COS converter 14 supplies the gasification gas $G_3$ to the desulfurizer 16 as the gasification gas $G_4$. Even when the gas clean-up unit 2 is configured in this manner, because hydrogen cyanide in the gasification gas $G_2$ is removed by the cleaner 18, it is possible to prevent the deposition of trace components in the gasification gas $G_2$.

Figure 3:
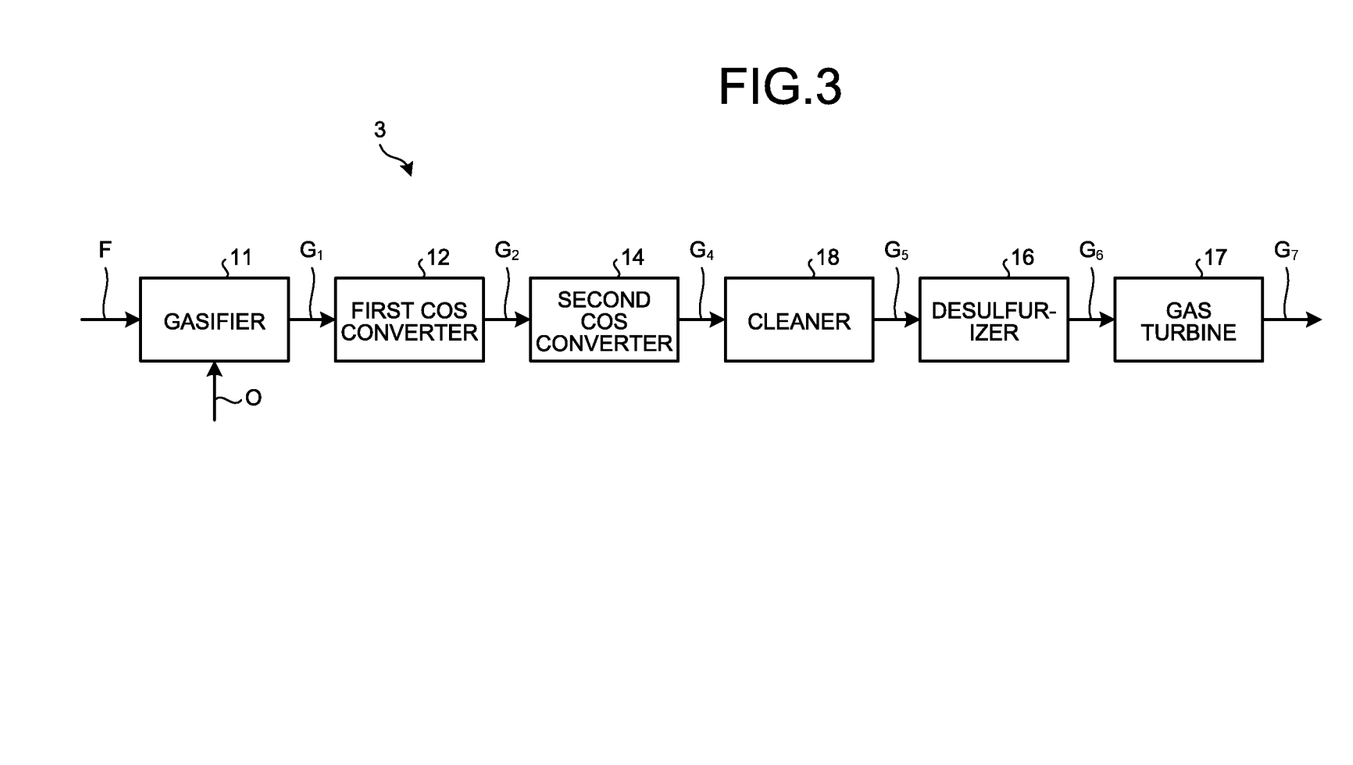
FIG. 3 is a schematic diagram illustrating another example of the gas clean-up unit according to the first embodiment of the present invention.

FIG. 3 is a schematic diagram illustrating another example of the gas clean-up unit according to the present embodiment. As illustrated in FIG. 3, in a gas clean-up unit 3, the second COS converter 14 is provided in the subsequent stage of the first COS converter 12, and the cleaner 18 is provided in the subsequent stage of the second COS converter 14. In other words, in the gas clean-up unit 3, the cleaner 18 is provided instead of the second cleaner 15 of the gas clean-up unit 1 illustrated in FIG. 1, and the first cleaner 13 is omitted therefrom. Moreover, a heat exchanger that adjusts the gasification gas $G_2$ to the second predetermined temperature may be provided between the first COS converter 12 and the second COS converter 14. Because the other configurations of the gas clean-up unit 3 are the same as those of the gas clean-up unit 1 illustrated in FIG. 1, the descriptions thereof will be omitted.

In the gas clean-up unit 3, the first COS converter 12 supplies the gasification gas $G_2$ that is obtained by performing a first conversion process on the gasification gas $G_1$, to the second COS converter 14. The second COS converter 14 performs a second conversion process on the gasification gas $G_2$ and reduces the concentration of carbonyl sulfide in the gasification gas $G_2$ to a predetermined concentration. Then, the second COS converter 14 supplies the gasification gas $G_2$ to the cleaner 18 as the gasification gas $G_4$. Similar to the second cleaner 15 described above, the cleaner 18 performs a cleaning process of bringing the gasification gas $G_4$ into gas-liquid contact with cleaning liquid. Consequently, ammonia that is the decomposition of hydrogen cyanide, halogen, and the like in the gasification gas $G_4$ are removed by cleaning. Moreover, the cleaner 18 supplies the gasification gas $G_5$ after the cleaning process to the desulfurizer 16. Even when the gas clean-up unit 3 is configured in this manner, because hydrogen cyanide in the gasification gas $G_4$ is removed by the cleaner 18, it is possible to prevent the deposition of trace components in the gasification gas $G_2$.

As described, with the embodiment described above, halogen, ammonia obtained through the first conversion process performed in the first COS converter 12, and the like are removed by cleaning in the first cleaning process. Consequently, even when the gasification gas $G_2$ is cooled to the first predetermined temperature or less, it is possible to prevent the deposition of trace components in the gasification gas $G_2$. Thus, not only the process on hydrogen cyanide will not be necessary, but it is also possible to perform the second conversion process of converting carbonyl sulfide to hydrogen sulfide, while cooling the gasification gas $G_2$ to which the first conversion process is performed to the second predetermined temperature that is equal to or lower than the first predetermined temperature and that is suitable for the second conversion process for carbonyl sulfide. Moreover, because carbonyl sulfide in the gasification gas $G_1$ is converted to hydrogen sulfide in two steps of the first conversion process and the second conversion process, it is possible to effectively reduce the concentration of carbonyl sulfide in the gasification gas $G_1$ to a desired concentration. Consequently, it is possible to implement the gas clean-up units 1, 2, and 3 that can effectively reduce the concentration of carbonyl sulfide in the gasification gas $G_1$, even when the concentration of carbonyl sulfide in the gasification gas $G_1$ is high.

Second Embodiment

Next, a second embodiment of the present invention will be described. In the following embodiments, points different from those in the first embodiment described above will be mainly explained, and repeated explanation will be omitted. Moreover, the same reference numerals denote the same components as those in the first embodiment described above. Furthermore, the following embodiments can be implemented by a suitable combination.

Figure 4:
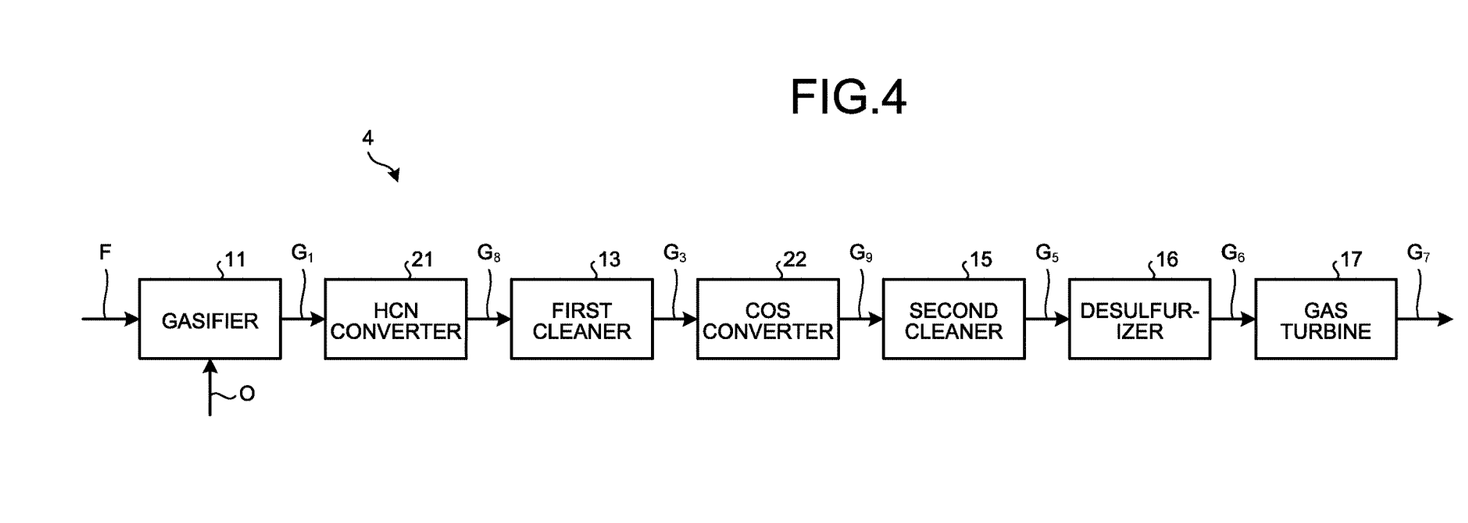
FIG. 4 is a schematic diagram illustrating an example of a gas clean-up unit according to a second embodiment of the present invention.

FIG. 4 is a schematic diagram illustrating an example of a gas clean-up unit 4 according to a second embodiment of the present invention.

As illustrated in FIG. 4, the gas clean-up unit 4 according to the present embodiment includes the gasifier (gasification unit) 11 to which the feedstock F and the oxygen containing gas O are fed, a hydrogen cyanide converter 21 (hereinafter, referred to as an "HCN converter 21") provided in the subsequent stage of the gasifier 11, the first cleaner (first cleaning unit) 13 provided in the subsequent stage of the HCN converter 21, a carbonyl sulfide converter (second conversion unit) 22 (hereinafter, referred to as a "COS converter 22") provided in the subsequent stage of the first cleaner 13, the second cleaner (second cleaning unit) 15 provided in the subsequent stage of the COS converter 22, and the desulfurizer (desulfurization unit) 16 provided in the subsequent stage of the second cleaner (second cleaning unit) 15. In other words, in the gas clean-up unit 4, the HCN converter 21 is provided instead of the first COS converter 12 in the gas clean-up unit 1 illustrated in FIG. 1, and the COS converter 22 is provided instead of the second COS converter 14.

In the presence of the first catalyst and at the first predetermined temperature, the HCN converter 21 mainly performs a first conversion process of converting hydrogen cyanide contained in the gasification gas $G_1$ to ammonia, as represented by the following reaction formulae (2) and (3). In this example, not only the first conversion process for hydrogen cyanide is performed, but also a conversion process of converting carbonyl sulfide to hydrogen sulfide represented by the following formula (1) proceeds as a side reaction. Moreover, the HCN converter 21 also supplies gasification gas $G_8$ containing ammonia and a small amount of hydrogen sulfide produced by the first conversion process, to the first cleaner 13. By performing the first conversion process as described above, it is possible to decompose and remove hydrogen cyanide contained in the gasification gas $G_1$.

$$COS+H_2O \Leftrightarrow H_2S+CO_2 \quad \text{formula(1)}$$

$$HCN+H_2O \Leftrightarrow NH_3+CO \quad \text{formula (2)}$$

$$HCN+3H_2 \Leftrightarrow NH_3+CH_4 \quad \text{formula (3)}$$

The first catalyst is not particularly limited as long as the first catalyst can decompose hydrogen cyanide, and a conventionally known catalyst for decomposing hydrogen cyanide may be used.

The temperature range of the first predetermined temperature is preferably equal to or higher than 240 degrees Celsius and equal to or lower than 350 degrees Celsius, more preferably equal to or higher than 240 degrees Celsius and equal to or lower than 320 degrees Celsius, and furthermore preferably equal to or higher than 240 degrees Celsius and equal to or lower than 300 degrees Celsius. By setting the temperature range of the first predetermined temperature as described above, it is possible to sufficiently reduce hydrogen cyanide that still remains in the gasification gas $G_8$ after the first conversion process.

The first cleaner 13 performs a first cleaning process of removing ammonia in the gasification gas $G_8$ by bringing the gasification gas $G_8$ to which the first conversion process is performed into gas-liquid contact with cleaning liquid, and cooling the gasification gas $G_8$. Moreover, the first cleaner 13 supplies the gasification gas $G_3$ after the first cleaning process to the COS converter 22. In the first cleaning process, not only ammonia in the gasification gas $G_8$ is removed by cleaning, but also the gasification gas $G_8$ is cooled (for example, equal to or higher than 100 degrees Celsius and equal to lower than 200 degrees Celsius) by coming into contact with cleaning liquid. With the first cleaning process such as the above, it is possible to remove ammonia from the gasification gas $G_8$ that will be a cause for the deposition of the trace components in the gasification gas $G_8$. Moreover, it is possible to cool the gasification gas $G_8$ to the temperature suitable for hydrolyzing carbonyl sulfide performed in the COS converter 22 in the subsequent stage. To effectively bring the temperature of the gasification gas $G_3$ after the first cleaning process to the second predetermined temperature, a heat exchanger that adjusts the temperature of the gasification gas $G_3$ to the second predetermined temperature may be provided between the first cleaner 13 and the COS converter 22.

In the presence of the second catalyst and at the second predetermined temperature that is lower than the first predetermined temperature, the COS converter 22 performs a second conversion process of converting carbonyl sulfide that still remains in the gasification gas $G_3$ to which the first cleaning process is performed, to hydrogen sulfide, as represented by the following reaction formula (1). Moreover, the COS converter 22 supplies gasification gas $G_9$ after the second conversion process to the second cleaner 15. In the second conversion process, because the gasification gas $G_3$ is cooled to a temperature suitable for hydrolyzing carbonyl sulfide by the first cleaning process, the chemical equilibrium of the following reaction formula (1), which is an exothermic reaction, becomes advantageous for the hydrolysis reaction of carbonyl sulfide. Consequently, it is possible to effectively reduce the concentration of carbonyl sulfide in the gasification gas $G_3$.

$$COS+H_2O \Leftrightarrow H_2S+CO_2 \quad \text{formula(1)}$$

The second catalyst is not particularly limited as long as the second catalyst can hydrolyze carbonyl sulfide, and for example, the same catalyst as the first catalyst according to the first embodiment described above and the like may be used. Moreover, a catalyst suitable for hydrolyzing carbonyl sulfide that is different from the first catalyst may also be used as the second catalyst. Furthermore, a pellet-shaped catalyst may be used as the second catalyst.

The temperature range of the second predetermined temperature is preferably equal to or higher than 150 degrees Celsius and equal to or lower than 240 degrees Celsius, and more preferably equal to or higher than 180 degrees Celsius and equal to or lower than 210 degrees Celsius. By setting the temperature range of the second predetermined temperature as described above, the hydrolysis reaction of carbonyl sulfide proceeds quickly. Moreover, because the chemical equilibrium of the reaction formula (1) described above becomes advantageous for the hydrolysis reaction of carbonyl sulfide, it is possible to sufficiently reduce the concentration of carbonyl sulfide in the gasification gas $G_9$ after the second conversion process.

The second cleaner 15 performs a second cleaning process for removing hydrogen sulfide in the gasification gas $G_9$ by bringing the gasification gas $G_9$ to which the second conversion process is performed into gas-liquid contact with cleaning liquid. By performing the second cleaning process, impurities in the gasification gas $G_9$ are removed by cleaning. Moreover, the second cleaner 15 supplies the gasification gas $G_5$ after the second cleaning process to the desulfurizer 16. Because the other configurations are the same as those of the gas clean-up unit 1 illustrated in FIG. 1, the descriptions thereof will be omitted.

Next, the overall operation of the gas clean-up unit 4 will be described. The gasification gas $G_1$ that is produced by gasifying the feedstock F in the gasifier 11 is supplied to the HCN converter 21. In the HCN converter 21, the first conversion process is performed on the gasification gas $G_1$ at the first predetermined temperature (for example, equal to or higher than 240 degrees Celsius and equal to or lower than 350 degrees Celsius). Moreover, hydrogen cyanide is decomposed into ammonia and removed from the gasification gas $G_1$, and the gasification gas $G_1$ is supplied to the first cleaner 13 as the gasification gas $G_8$. In the first cleaner 13, ammonia, halogen, and the like in the gasification gas $G_8$ are removed by cleaning through the first cleaning process of bringing the gasification gas $G_8$ into gas-liquid contact with cleaning liquid. Moreover, the gasification gas $G_8$ is cooled to the second predetermined temperature (for example, equal to or higher than 150 degrees Celsius and equal to or lower than 240 degrees Celsius), and is supplied to the COS converter 22 as the gasification gas $G_3$. In the COS converter 22, carbonyl sulfide in the gasification gas $G_3$ is hydrolyzed by the second conversion process, and the concentration of carbonyl sulfide is reduced to the predetermined concentration. Then, the gasification gas $G_3$ is supplied to the second cleaner 15 as the gasification gas $G_9$. In the second cleaner 15, impurities in the gasification gas $G_9$ are removed by the second cleaning process of bringing the gasification gas $G_9$ into gas-liquid contact with cleaning liquid. Then, the gasification gas $G_9$ is supplied to the desulfurizer 16 as the gasification gas $G_5$. In the desulfurizer 16, the gasification gas $G_5$ is supplied to the gas turbine 17 as the clean syngas $G_6$ from which hydrogen sulfide is removed, by bringing the gasification gas $G_5$ into gas-liquid contact with absorbent. In the gas turbine 17, the clean syngas $G_6$ is burnt with oxygen and is discharged as combustion flue gas $G_7$.

Figure 5:
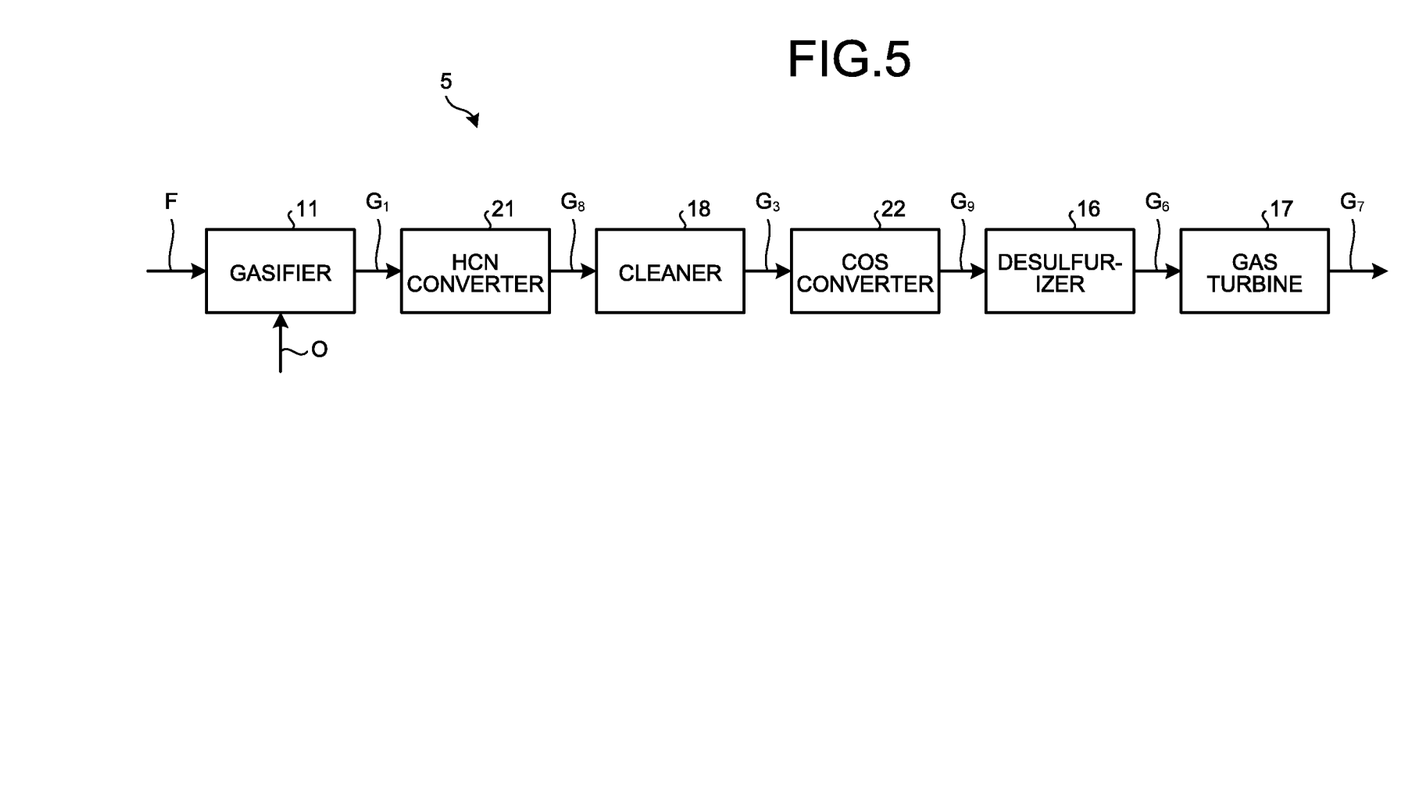
FIG. 5 is a schematic diagram illustrating another example of the gas clean-up unit according to the second embodiment of the present invention.

In the gas clean-up unit 4 illustrated in FIG. 4, an example of providing two cleaners of the first cleaner 13 and the second cleaner 15 is described. However, the gas clean-up unit 4 may also include a single cleaner. FIG. 5 is a schematic diagram illustrating another example of the gas clean-up unit according to the present embodiment. As illustrated in FIG. 5, in a gas clean-up unit 5, the cleaner 18 is provided in the subsequent stage of the HCN converter 21, and the desulfurizer 16 is provided in the subsequent stage of the COS converter 22. In other words, in the gas clean-up unit 5, the cleaner 18 is provided instead of the first cleaner 13 in the gas clean-up unit 4 illustrated in FIG. 4, and the second cleaner 15 is omitted therefrom. Moreover, a heat exchanger that adjusts the gasification gas $G_8$ to the predetermined temperature may be provided between the HCN converter 21 and the cleaner 18. Because the other configurations are the same as those of the gas clean-up unit 4 illustrated in FIG. 4, the descriptions thereof will be omitted.

In the gas clean-up unit 5, the HCN converter 21 supplies the gasification gas $G_8$ obtained by performing a first conversion process on the gasification gas $G_1$ at the first predetermined temperature, to the cleaner 18. Similar to the first cleaner 13 described above, the cleaner 18 performs a cleaning process of bringing the gasification gas $G_8$ into gas-liquid contact with cleaning liquid, and cools the gasification gas $G_8$ to the second processing temperature. Consequently, ammonia that is the decomposition of hydrogen cyanide, halogen, and the like in the gasification gas $G_8$ are removed by cleaning. Moreover, the cleaner 18 supplies the gasification gas $G_3$ after the cleaning process to the COS converter 22. The COS converter 22 performs a second conversion process on the gasification gas $G_3$ at the second predetermined temperature, and supplies the gasification gas $G_3$ to the desulfurizer 16 as the gasification gas $G_9$. Even when the gas clean-up unit 5 is configured in this manner, because ammonia in the gasification gas $G_8$ is removed by the cleaner 18, it is possible to prevent the deposition of trace components in the gasification gas $G_8$.

Figure 6:
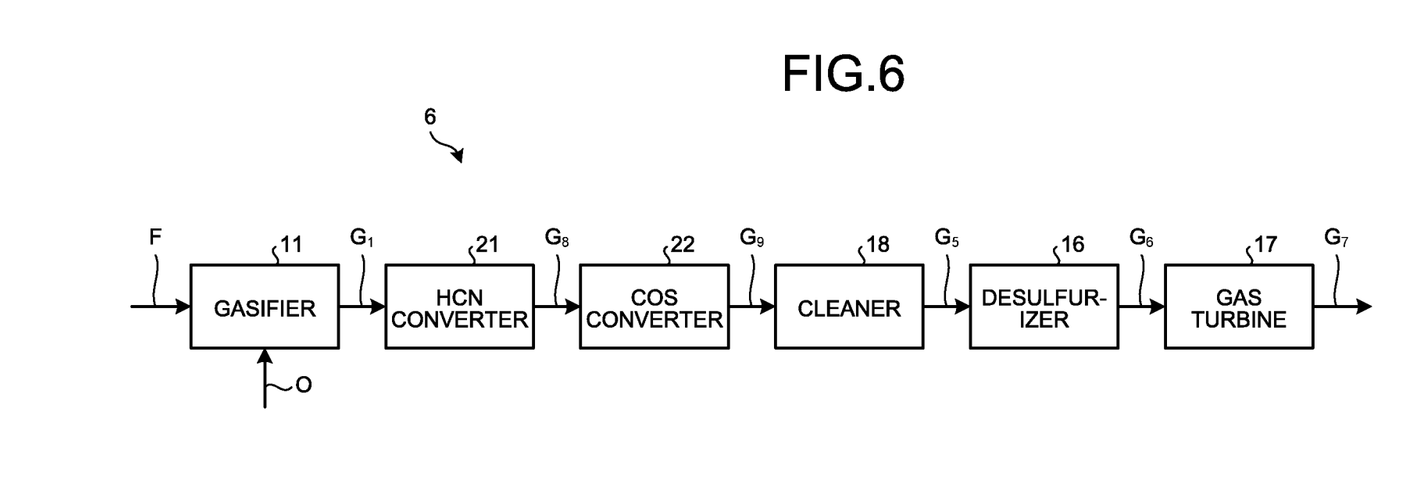
FIG. 6 is a schematic diagram illustrating another example of the gas clean-up unit according to the second embodiment of the present invention.

FIG. 6 is a schematic diagram illustrating another example of the gas clean-up unit according to the present embodiment. As illustrated in FIG. 6, in a gas clean-up unit 6, the COS converter 22 is provided in the subsequent stage of the HCN converter 21, and the cleaner 18 is provided in the subsequent stage of the COS converter 22. In other words, in the gas clean-up unit 6, the cleaner 18 is provided instead of the second cleaner 15 of the gas clean-up unit 4 illustrated in FIG. 4, and the first cleaner 13 is omitted therefrom. Moreover, a heat exchanger that adjusts the gasification gas $G_8$ to the predetermined temperature may be provided between the HCN converter 21 and the COS converter 22. Because the other configurations are the same as those of the gas clean-up unit 4 illustrated in FIG. 4, the descriptions thereof will be omitted.

In the gas clean-up unit 6, the HCN converter 21 supplies the gasification gas $G_8$ obtained by performing a first conversion process on the gasification gas $G_1$ at the first predetermined temperature, to the COS converter 22. The COS converter 22 performs a second conversion process on the gasification gas $G_8$ at the second predetermined temperature, and supplies the gasification gas $G_8$ to the cleaner 18 as the gasification gas $G_9$. Similar to the second cleaner 15 described above, the cleaner 18 performs a cleaning process of bringing the gasification gas $G_9$ into gas-liquid contact with cleaning liquid. Consequently, halogen, ammonia that is the decomposition of hydrogen cyanide, and the like in the gasification gas $G_8$ are removed by cleaning. Moreover, the cleaner 18 supplies the gasification gas $G_5$ after the cleaning process to the desulfurizer 16. Even when the gas clean-up unit 6 is configured in this manner, because hydrogen cyanide in the gasification gas $G_9$ is removed by the cleaner 18, it is possible to prevent the deposition of trace components in the gasification gas $G_8$.

As described above, with the embodiment described above, halogen, ammonia obtained through the first conversion process performed by the HCN converter 21, and the like are removed by cleaning through the first cleaning process. Consequently, it is possible to prevent the deposition of trace components in the gasification gas $G_8$ even when the gasification gas $G_8$ is cooled to equal to or lower than the first predetermined temperature. Thus, not only the process on hydrogen cyanide will not be necessary, but it is also possible to perform the second conversion process of converting carbonyl sulfide to hydrogen sulfide, while cooling the gasification gas $G_8$ to which the first conversion process is performed, to the second predetermined temperature that is equal to or lower than the first predetermined temperature and that is suitable for the second conversion process for carbonyl sulfide. Moreover, in the first conversion process, the first catalyst that selectively decomposes hydrogen cyanide can be used for carbonyl sulfide. Consequently, it is possible to use the first catalyst different from the second catalyst that hydrolyzes carbonyl sulfide. Moreover, it is possible to reduce the use amount of the second catalyst required for hydrolyzing carbonyl sulfide. Thus, it is possible to implement the gas clean-up units 4, 5, and 6 that can effectively reduce the concentration of carbonyl sulfide in the gasification gas $G_1$, even when the concentration of carbonyl sulfide in the gasification gas $G_1$ is high.

REFERENCE SIGNS LIST 1, 2, 3, 4, 5, 6 Gas clean-up unit
11 Gasifier
12 First COS converter
13 First cleaner
14 Second COS converter
15 Second cleaner
16 Desulfurizer
17 Gas turbine
21 HCN converter
22 COS converter
F Feedstock
$G_1$, $G_2$, $G_3$, $G_4$, $G_5$, $G_8$, $G_9$ Gasification gas
$G_6$ Clean syngas
$G_7$ Combustion flue gas
O Oxygen containing gas

The invention claimed is:

1. A gas clean-up unit, comprising:
   a first conversion unit configured to perform a first conversion process of converting hydrogen cyanide contained in gas to be treated to ammonia, in presence of a first catalyst and at a first predetermined temperature;
   a second conversion unit configured to perform a second conversion process of converting carbonyl sulfide in the gas to be treated that has been subjected to the first conversion process to hydrogen sulfide, in presence of a second catalyst and at a second predetermined temperature that is lower than the first predetermined temperature;
   a cleaning unit configured to perform a cleaning process of bringing the gas to be treated into gas-liquid contact with cleaning liquid to remove the ammonia by cleaning; and
   a desulfurization unit configured to absorb and removes hydrogen sulfide in the gas to be treated by bringing the gas to be treated that has been subjected to the cleaning process into gas-liquid contact with absorbent,
   wherein the cleaning unit includes a first cleaning unit configured to perform a first cleaning process of bringing the gas to be treated that has been subjected to the first conversion process into gas-liquid contact with cleaning liquid, and a second cleaning unit configured to perform a second cleaning process of bringing the gas to be treated that has been subjected to the second conversion process into gas-liquid contact with cleaning liquid.

2. The gas clean-up unit according to claim 1, further comprising a gasification unit configured to produce the gas to be treated containing carbonyl sulfide by gasifying a feedstock, and to supply the produced gas to be treated to the first conversion unit.

3. The gas clean-up unit according to claim 1, wherein the first conversion unit converts carbonyl sulfide to hydrogen sulfide and converts hydrogen cyanide to ammonia.

4. The gas clean-up unit according to claim 1, wherein the first predetermined temperature is equal to or higher than 240 degrees Celsius and equal to or lower than 350 degrees Celsius.

5. The gas clean-up unit according to claim 1, wherein the second predetermined temperature is equal to or higher than 150 degrees Celsius and equal to or lower than 240 degrees Celsius.

6. A gas purification method, comprising:
   performing a first conversion process of converting hydrogen cyanide contained in gas to be treated to ammonia, in presence of a first catalyst and at a first predetermined temperature;
   performing a second conversion process of converting carbonyl sulfide in the gas to be treated that has been subjected to the first conversion process to hydrogen sulfide, in presence of a second catalyst and at a second predetermined temperature that is lower than the first predetermined temperature;
   bringing the gas to be treated into gas-liquid contact with cleaning liquid to remove the ammonia by cleaning; and
   bringing the gas to be treated from which ammonia is removed by cleaning into gas-liquid contact with absorbent to remove hydrogen sulfide in the gas to be treated by absorbing,
   wherein bringing the gas to be treated into gas-liquid contact with cleaning liquid includes
      performing a first cleaning process of bringing the gas to be treated that has been subjected to the first conversion process into gas-liquid contact with cleaning liquid, and
      performing a second cleaning process of bringing the gas to be treated that has been subjected to the second conversion process into gas-liquid contact with cleaning liquid.

7. The gas purification method according to claim 6, further comprising producing the gas to be treated containing carbonyl sulfide by gasifying a feedstock.

* * * * *